United States Patent Office 2,977,283
Patented Mar. 28, 1961

2,977,283

THERAPEUTIC INTRAVENOUS FAT COMPOSITIONS

Curtis E. Meyer, Charleston Township, Kalamazoo County, Mich., James A. Fancher, Kalamazoo, Mich., and Paul E. Schurr, Portage Township, Kalamazoo County, Mich., assignors to The Upjohn Company, Kalamazoo, Mich., a corporation of Michigan No Drawing. Original application Apr. 30, 1956, Ser. No. 581,269. Divided and this application Sept. 5, 1957, Ser. No. 682,081

7 Claims. (Cl. 167—66)

This invention relates to a therapeutic fat product and more particularly relates to a therapeutic fat product which is especially well-suited for intravenous use in human beings. It also relates to an emulsifier utilized in the fat product and a process for its preparation.

Co-pending application Serial No. 456,637, filed September 16, 1954, now U.S. Patent No. 2,870,019, relates to a therapeutic fat product which was a distinct improvement over previously existing fat products, since it greatly reduced the number of undesirable reactions following intravenous administration to humans or animals. However, even that preparation causes some clinical reactions, amounting to approximately thirty percent of the patients treated. These reactions consist of chills, fever, backache, chest pain, nausea, vomiting, dyspnea, apnea, blood pressure effects and the like. The reactions are all the more troublesome because many of them are not observed in the usual laboratory animals. It has now been discovered that a particular soya phosphatide fraction will produce suitable intravenous fat emulsion which significantly reduces the number of the previously indicated undesirable reactions.

It is therefore an object of the present invention to provide a therapeutic fat product which is especially well-suited for intravenous use in human beings or animals. Another object of the present invention is to provide a therapeutic fat product which is physically and chemically stable and which has significantly fewer undesirable reactions than previously existing products when administered intravenously to human beings. A further object is the provision of such a product which has a much lower incidence of clinical reactions, such as chills, backache, chest pain, nausea, vomiting, dyspnea, apnea, blood pressure effects, and the like, when used intravenously in human beings. Still another object is the provision of a new, essentially unreactive soya phosphatide fraction which can be used as an emulsifier for an intravenous fat product. A further object is the provision of a process for the preparation of such a soya phosphatide fraction. Other objects will be apparent to one skilled in the art to which this invention pertains.

The foregoing and additional objects have been accomplished by the provision of a therapeutic fat product which is especially suitable for intravenous use in human beings and which comprises a metabolizable, non-toxic, fixed oil emulsified in an aqueous vehicle by a stable soya phosphatide fraction (1) which does not depress blood pressure when injected into anesthetized cats, and (2) which can be prepared by absorbing the undesirable reactive materials found in the monatomic, lower molecular weight aliphatic alcohol-soluble soya phosphatides on an adsorbent selected from the group consisting of aluminum oxide, magnesium oxide and activated carbon. It is preferred that a co-emulsifier be used with the soya phosphatide fraction of the present composition. The ethylene oxide-polypropylene glycol condensation product more particularly described in co-pending application Serial No. 456,637, now U.S. Patent No. 2,870,019, is most suitable for the purpose, although other co-emulsifiers may be used satisfactorily. The condensation product is characterized as a polyalkylene glycol in which the alkylene units consist of ethylene and propylene units, said propylene units being in non-terminal positions and connected to each other in a chain.

This invention also provides (1) a novel soya phosphatide fraction which is essentially unreactive in the clinic and which can be used as an emulsifier in the therapeutic fat product and (2) a novel process for the preparation of the said soya phosphatide fraction.

The metabolizable, non-toxic, fixed oils suitable for the therapeutic fat product include naturally occurring vegetable and animal oils, as well as synthetic oils. Those found to be most suitable are cottonseed oil, olive oil, peanut oil, coconut oil, sesame oil, corn oil and the like. An example of a suitable synthetic oil is that disclosed in U.S. Patent No. 2,728,706. Mixtures of the foregoing oils can also be used. Cottonseed oil and olive oil are preferred.

The physical stability of the emulsion of these oils is important. Particles of these oils should be less than about 2.5 microns in diameter and preponderantly below about 0.5 micron in diameter. These particle sizes should be stable under various test conditions considered valid indicators of physical stability for pharmaceutical fat emulsions.

Isotonic agents are desirable for introvenous fat products since they impart proper tonicity to the emulsion. Metabolizable sugars and polyhydroxyalcohols are well-suited for this purpose. Suitable sugars are the monosaccharides, such as glucose (dextrose) and fructose. Suitable polyhydroxy alcohols include sorbitol.

The ethylene oxide-polypropylene glycol condensation product used as co-emulsifier in the fat product is defined in U.S. Patent No. 2,674,619 and co-pending application Serial No. 456,637, filed September 16, 1954. They are represented by the following formula:

$$HO(C_2H_4O)_a(C_3H_6O)_b(C_2H_4O)_cH$$

wherein $a$, $b$ and $c$ are positive integers which can be varied over a wide range. Within the limitations inherent in the preferred composition of the present invention, it is desirable to use a formula having a base molecular weight between about 1500 and about 1800 with between about eighty and about ninety percent ethylene oxide in the molecule. The "base" is the polypropylene glycol unit. Such a formula can also be designated by reference to the structural formula as one in which $b$ equals between about 25 and about 32 and $a+c$ equals between about 136 and about 368. An example of a product coming within the above-indicated preferred specifications is Pluronic F 68 manufactured by the Wyandotte Chemical Corporation.

An antioxidant can be added to prevent oxidation of the oils during processing and rancidity during storage. Metabolizable antioxidants of the phenolic type, such as tertiary butyl anisoles and the like, are suitable. It is preferred to use a combination of tertiary butyl-4-hydroxyanisole, propylgallate, and citric acid.

The concentrations of various ingredients which can be utilized in the present composition can be carried over a wide range. However, the desirable overall characteristics tend to limit somewhat the permissible variations of the concentration of the particular ingredients. One such characteristic is the caloric value of the fat and sugar in any particular combination. Another characteristic which tends to limit the amount of the ingredients is the viscosity of the suspension. It is not desirable that the weight of the oil exceed about fifty percent wt./vol., otherwise the product tends to be too viscous for injection. From the caloric standpoint, the lower limit for an intravenous product such as the present composition is about ten percent wt./vol. The preferred concentration of oil is about fifteen to about 25 percent wt./vol. for intravenous use. The concentration of sugar in the composition of the present invention should be between about three percent and ten percent wt./vol. of the water, preferably about five percent.

Although the therapeutic fat product of the present invention is primarily designed for intravenous use, the composition can also be used orally. However, a successful oral product would not require that the phosphatides be processed to the same extent as for an intravenous product. The concentrations indicated above would, of course, be somewhat different for an oral product than for an intravenous product.

Once the concentrations of the oils and sugars have been fixed within the ranges specified above, the concentration of the soya phosphatide fraction for intravenous use can be varied between about 0.5 to about three percent wt./vol. (1.2 percent preferred). The concentration of the preferred ethylene oxide-polypropylene glycol condensation product can be varied from about 0.2 to about 0.5 percent wt./vol. (0.3 percent preferred) for the intravenous product. Thus, the amounts of the emulsifiers utilized in the composition of the present invention depends upon the amount of oil chosen.

In carrying out the process of preparing the soya phosphatide fraction of the present invention, commercially available soya phosphatides, such as Lecithin RG (Glidden), or the alcohol-soluble fraction of soya phosphatides (e.g., Lecithin RAS, Glidden) can be used as starting material. It is desirable that each of these products be extracted with a monatomic, lower molecular weight aliphatic alcohol, e.g., methanol, ethanol, propanol, isopropanol, or mixtures thereof. Ethanol is preferred, partly because of higher yield and partly because it is less toxic if incompletely removed from the product. It is preferred that this extraction be carried out at about room temperature. Absolute ethanol need not be used. In fact alcohol U.S.P. (not less than 94.9 percent by volume of $C_2H_5OH$) is preferred. If thirty percent or more water is used, however, the desirable phosphatide fraction will also partially precipitate out. Thus, ethanol in a concentration of 85 to 100 percent is operative.

This alcohol-soluble fraction is not entirely satisfactory since it still contains reactive substances which, when made up into a fat emulsion for intravenous use, causes the undesirable clinical reactions noted above. It is necessary, therefore, that the alcohol-soluble fraction be contacted with an adsorbent selected from the group consisting of aluminum oxide, magnesium oxide and activated carbon. Acid-washed carbon should be avoided. The harmful substances remain adsorbed on the adsorbent, and the soya phosphatide fraction which remains dissolved in the alcohol will not only provide a suitable emulsifier for the intravenous fat product of the present invention, but will also eliminate or significantly reduce such undesirable effects as chills, backache, chest pain, nausea, vomiting, dyspnea, apnea, blood pressure effects and the like, when made up into a fat emulsion.

In the preferred embodiment of the process of purification, the ethanol-soluble portion of soya phosphatide in about ten vol./wt. of ethanol is stirred with about two parts by weight of aluminum oxide for about thirty minutes at room temperature. The adsorption time can be reduced to as little as ten minutes, and the adsorption will still be satisfactory. When the aluminum oxide is reduced in quantity to as low as 1.5 parts by weight, the product produced is unsatisfactory. After the aluminum oxide is filtered out, the alcohol is removed under reduced pressure, and the material is taken up in an appropriate amount of vegetable oil for the preparation of an emulsion.

A suitable screen to determine the clinical reactiveness of the soya phosphatide fraction is the test for blood depressor effects in cats. If the blood depressor effect is not observed in an anesthetized cat, the material tested will not possess such undesirable reactions when administered to humans. The "cat" test referred to herein is substantially that described by Geyer et al., J. Lab. Clin. Med. 34, 688 (1949). Geyer et al. reported that the phosphatide fraction prepared by the use of solvents was nonreactive in cats when freshly prepared. However, emulsions prepared with this material became reactive within four days. The soya phosphatide fraction useful in the composition of the present invention does not become reactive when used in an emulsion even though stored for a considerable period of time.

In carrying out the "cat" test a cat is anesthetized with sodium salt of 5 - ethyl-5-(1-methylbutyl)-barbituric acid. The jugular vein and carotid artery are canulated. The carotid artery is connected to a merclury manometer equipped to record blood pressure. An intravenous injection of the material to be tested, e.g., a soya phosphatide fraction, is added via the juglar canula, and the blood pressure is recorded, noting the rise or fall. If a fall in pressure is to occur at all, it will occur almost immediately after injection.

The chemical composition of the soya phosphatide fraction of the present invention cannot be characterized exactly. This is generally true of any mixture of phosphatides derived from natural sources. The complexity of the problem is shown by many papers appearing in the literature, e.g., Scholfield et al., J. Am. Oil. Chem. Soc., 25, 368 (1948). However, from the standpoint of reproductibility and practical utilization, the soya phosphatide fraction can be characterized as a stable fraction of soya phosphatides (1) which does not depress blood pressure when injected into anesthetized cats, (2) which can be prepared by adsorbing the undesirable reactive materials found in the monatomic, lower molecular weight aliphatic alcohol-soluble soya phosphatides on an adsorbent selected from the group consisting of aluminum oxide, magnesium oxide and activated carbon, and (3) which is a satisfactory emulsifier for the oil used in a therapeutic fat product.

In addition, the sola phosphatide fraction can be characterized chemically sufficiently to differentiate it from the whole soya phosphatides and other fractions thereof. The general structure of phosphatides is represented by the following structural formula:

$$\begin{array}{c} \quad\quad\quad O \\ \quad\quad\quad \| \\ H_2C-O-C-R \\ \quad\quad\quad O \\ \quad\quad\quad \| \\ H_2C-O-C-R \\ \quad\quad\quad O \\ \quad\quad\quad \| \\ H_2C-O-P-O\,R' \\ \quad\quad\quad | \\ \quad\quad\quad O \\ \quad\quad\quad H \end{array}$$

wherein the R's represent fatty acids which have been found by Hilditch and Pedelty (Wittcoff, The Phosphatides, Reinhold Publishing Corp., 1951, p. 223) to be present in soybean phosphatides as:

| | Percent |
|---|---|
| Palmitic | 11.7 |
| Stearic | 4.0 |
| Arachidic | 1.4 |
| Hexadecenoic | 8.6 |
| Oleic | 5.5 |
| Linoleic | [1]63.3 |
| $C_{20}$ unsat | 5.5 |

[1] Includes some linolenic.

In lecithin R′=choline.

In cephalins R′=ethanolamine, serine or inositol, although in the case of inositol this structure is an oversimplification.

Total nitrogen is therefore a measure of all the phosphatides (if that is all the nitrogen-containing material that is present) except phosphatidylinositol.

Total phosphorus is likewise such a measure, and further, for either pure lecithin, phosphatidylserine or phosphatidylethanolamine, the molecular ratio of N to P is 1.0.

The percent by weight of the fatty acids, the saponification value and iodine value of the phosphatides and the neutral equivalent and iodine value of the fatty acids is a measure and description of the average of the fatty acids present.

Among the most significant figures are those of choline, serine, and ethanolamine, which can be translated into the parent compounds. It is also evident that for a pure compound the molecular ratio of one of these constituents, e.g., chloine in the case of lecithin, to P is unity.

The value for inositol is also important, as the present state of knowledge indicates that it is an integral part of several phosphatides whose structures have not been definitely determined.

In the soya phosphatide fraction of the present invention, the proportion of lecithin has been increased while the proportion of cephalin components, especially the inositol, have been reduced. This is suggestive that inositol might be the undesirable active ingredient, but at the present time this is merely a good guess.

In the analysis, the present soya phosphatide fraction is a material having approximately this composition which does not cause a fall in the blood pressure of the anesthetized cat.

The following examples are illustrative of the composition of the present invention but are not to be construed as limiting.

EXAMPLE 1

300 grams of a granular soya phosphatide (Glidden Lecithin RG) which has been shown to have high depressor activity in cats were extracted three times with 600-milliliter portions of absolute ethanol in a Waring Blendor for 1–2 minutes at room temperature. The extracts were clarified by gravity filtration and concentrated under reduced pressure to 250 milliliters. A solids determination indicated 95.7 grams of material were extracted. 73.5 milliliters containing 28 grams were put on a column of two pounds of aluminum oxide and developed with 95 percent aqueous ethanol. Fractions were taken.

|       | ml.   | gm.   |
|-------|-------|-------|
| No. 1 | 595   | <1.0  |
| No. 2 | 1,016 | 6.0   |
| No. 3 | 616   | 1.9   |
| No. 4 | 2,317 | 2.1   |

Fraction No. 2 was concentrated under reduced pressure for removal of alcohol. The residue was taken up in sufficient water to give a 1.2 percent solution, ⅔ of the solution was used to make up a five percent dextrose preparation, ½ of which was autoclaved. When these three solutions were injected into anesthetized cats through a jugular canula, they were found to be free of blood pressure depressor activity.

EXAMPLE 2

Ten grams of an alcohol-soluble fraction of soya phosphatides were dissolved in 100 milliliters of aqueous ethanol 95 percent. Twenty grams of aluminum oxide (Merck chromatographic) was added, and the mixture was shaken thirty minutes. The solution was decanted and filtered. The alcohol was removed under reduced pressure and the residue taken up in twenty milliliters of Skellysolve B. The solution was poured into ninety milliliters of acetone, whereupon an oil separated. The acetone-Skellysolve was decanted from the oil, which was then treated three times with acetone. The residue was freed of acetone in a vacuum desiccator. A 1.2 percent solution of the material in a five percent aqueous glucose solution did not depress blood pressure in the cat when injected at a level of 0.5 to five milliliters per kilogram.

EXAMPLE 3

300 grams of an alcohol-soluble fraction of soya phosphatide (Glidden Lecithin RAS) were dissolved in 1500 milliliters of aqueous ethanol 95 percent on a steam bath. The solution was allowed to come to room temperature. A gummy plastic residue which separated was removed by centrifugation. 1380 milliliters of solution were recovered. It was divided into two parts. 700 milliliters were placed in the refrigerator for six days. A heavy liquid layer settled to the bottom. The supernatant was decanted and to 100 milliliters of the supernatant containing 9.3 grams of solids were added 18.6 grams of aluminum oxide, Merck chromatographic. The mixture was shaken for thirty minutes. After removal of the aluminum oxide and alcohol, a 1.2 percent solution of the residual material was made in a five percent aqueous solution of dextrose. Five milliliters per kilogram injected into a cat gave no blood pressure depressor effect. The unrefrigerated portion of the original solution, 680 milliliters, was allowed to stand at room temperature one day. Unidentified amorphous material separated and was filtered off. The solution, containing 82.6 grams of solids, was stirred thirty minutes with 165.2 grams of aluminum oxide. After removal of the aluminum oxide and alcohol, a 1.2 percent solution of a portion of the residue was made in a five percent aqueous solution of glucose. Five milliliters per kilogram did not lower blood pressure in cats.

EXAMPLE 4

1235 milliliters of an alcohol solution containing 61.2 grams of soya phosphatide were stirred with 30.6 grams of aluminum oxide, Merck. A sample of the solution containing 1.29 grams of phosphatide was removed (1). To the remaining solution 29.95 grams more aluminum oxide were added and stirred for thirty minutes. A sample was removed (2).

To the main solution another 23.2 grams of aluminum oxide were added and the process repeated (sample 3). Finally, another 21.5 grams of aluminum oxide were added to the remaining solution and stirred thirty minutes (sample 4). A 1.2 percent solution of each sample was made in five percent dextrose and injected into cats.

|          | Ratio of Total Aluminum Oxide to Phosphatide | ml. | Effect on Blood Pressure |
|----------|---------|-----|--------------------------|
| Sample 1 | 0.5:1   | 1.5 | −20 mm.; −110 mm. Hg.    |
| Sample 2 | 1:1     | 5   | −60 mm.; −30 mm. Hg.     |
| Sample 3 | 1.5:1   | 5   | −50 mm.; −80 mm. Hg.     |
| Sample 4 | 2:1     | 5   | 0; +10 mm.; +10 mm. Hg.  |

EXAMPLE 5

Six kilograms of alcohol-soluble phosphatide (Glidden Lecithin Grade RAS) were extracted by stirring with sixty liters of aqueous alcohol (95 percent) for fifteen minutes. This was allowed to settle, and the supernatant was siphoned off. Twelve kilograms of aluminum oxide (Harshaw catalytic grade) were added to the supernatant, and the mixture stirred for thirty minutes. The mixture was allowed to settle, and the supernatant filtered through an alcohol-washed Seitz filter pad. Sixty liters of solution containing 2830 grams of the soya phosphatide fraction were obtained. The alcohol from 55.5 liters of this solution was removed in a flash still, 72 pounds of cottonseed oil being added during the process, Using this oil-phosphatide solution, the following quantities of materials were prepared into an emulsion:

| | | |
|---|---|---|
| 1.2% soya phosphatide fraction | grams | 2400 |
| 15% cottonseed oil (Wesson Oil) | pounds | 66 |
| 4% anhydrous dextrose | grams | 8000 |
| 0.3% Pluronic F 68 | do | 600 |
| Water for injection U.S.P. sufficient to make 200 liters. | | |

Forty liters of water were filtered into a large tank, and the temperature was raised to ninety degrees centigrade. The dextrose was added and followed by Pluronic F 68. This mixture was pumped into another large tank. The first tank was washed with filtered water, and the wash water was also pumped into the second tank. The solution in the second tank was filtered back into the first tank. The filter was also washed into the first tank, adjusting to approximately eighty liters. At seventy degrees centigrate the phosphatide-oil solution was added, and volume was brought up to 120 liters by adding filtered water. The resulting mixture was mixed thoroughly for five minutes by rapid stirring and then homogenized at 4000 pounds per square inch for twenty minutes at seventy degrees centigrade, recycling into the first tank. Meanwhile, eighty liters of water were placed in the second tank. The water from the second tank was added to the emulsion at seventy degrees centigrade. With pressure at 4000 pounds per square inch, the mixture was homogenized with a Manton-Gaulin homogenizer into tank 2. The last cycle was repeated twice, and the resulting emulsion was filtered into 600 milliliter centrifuge bottles. The emulsion was autoclaved at fifteen pounds per square inch for twenty minutes and cooled as rapidly as possible.

This emulsion did not cause a fall of blood pressure in anesthetized cats and was free of serious clinical reactions when injected intravenously into human beings.

emulsion made with the same phosphatide prior to treatment gave as much as 150 mm. Hg fall in blood pressure.

When used intravenously in human beings, this emulsion is free of serious clinical reactions.

EXAMPLE 7

In order to characterize the soya phosphatide fraction of the present invention and to compare it with other fractions as well as with the whole soya phosphatides, the process of the present invention was used to prepare material for chemical analyses.

1040 grams of an alcohol-soluble fraction of soya phosphatide (Glidden Lecithin RAS) were dissolved in ten liters of aqueous-ethanol (95 percent) and stirred twenty minutes. The solution was allowed to settle. A gummy, plastic residue which separated was discarded after decantation of the supernatant. 10,700 milliliters of supernatant were recovered. The alcohol was removed from part of this supernatant and the residue analyzed. The results of the analyses appear under the column headed "RAS/A1" in Table I. To 300 milliliters of the supernatant were added sixty grams of aluminum oxide, Merck chromatographic, and the mixture was shaken for thirty minutes. After removal of the aluminum oxide and alcohol, the residue was analyzed and possessed the analytical values shown in Table I. To still another 300-milliliter portion of the supernatant was added 45 grams of activated carbon (Norit-SG) and the mixture was shaken for thirty minutes. The carbon was filtered off; and since the filtrate still possessed a trace of color, it was again shaken for thirty minutes with an additional fifteen grams of activated carbon. The carbon was removed by filtration leaving a colorless filtrate and the alcohol was removed in vacuo yielding 2.48 grams of material. This material was analyzed and possessed the analytical values shown in Table I.

*Table I*

ANALYSES ON VARIOUS PHOSPHATIDES

| | Glidden Lecithin, RG [5] | Glidden Lecithin, RAS [6] | RAS/A1 [7] | $Al_2O_3$ Treated | Activated Carbon [4] Treated | Egg [1] Phos. | Hanahan [2] Egg Lecithin |
|---|---|---|---|---|---|---|---|
| Tot. Nitrogen, percent | 1.15 | 1.23 | 1.38 | 1.44 | 1.45 | 4.15 | 1.79 |
| Tot. Phosphorus, percent | 3.45 | 2.44 | 2.48 | 3.01 | 2.84 | 6.31 | 3.90 |
| Choline, percent | 3.00 | 6.23 | 7.16 | 10.60 | 10.04 | 13.85 | 15.30 |
| Inositol, percent | 2.41 | 0.207 | 0.08 | 0.01 | 0.04 | <.02 | ? |
| Ethanolamine, percent | 1.9 | 1.3 | 0.93 | 0.47 | 0.4 | 0.30 | 0 |
| Serine, percent | 0.41 | 0.10 | 0.11 | 0.045 | 0.4 | 0.20 | 0 |
| Iodine value (of whole fraction) | 76.1 | 92.2 | 82.0 | 85.9 | 69.4 | 11.2 | 88.0 |
| Ash, percent ($P_2O_5$) | 8.57 | 3.42 | 3.28 | 2.61 | 3.09 | 16.72 | |
| N:P mol. ratio | 0.736 | 1.112 | 1.23 | 1.026 | 1.128 | 1.440 | 1.00 |
| Reducing Sub.[3] (of hydrolyzed material) | 13.7 | 6.7 | | 2.16 | 28.3 | | |
| Fatty acids, percent | 55.8 | 67.1 | 66.1 | 70.7 | 47.8 | 19.3 | 70.0 |
| Iodine Value (of fatty acid) | 124.7 | 115.5 | 116.7 | 118.2 | 105.8 | | 91.0 |

[1] Treated with $Al_2O_3$ and activated carbon. This material still possessed the blood pressure depressor action in an anesthetized cat.
[2] Hanahan et al., J. Biol. Chem. 192, 623 (1951).
[3] As galactose. Folin-Wu assay used. J. Biol. Chem. 41, 367 (1920).
[4] Norit-SG, American Norit Company.
[5] A commercial "solid" soya phosphatide mixture containing essentially all of the phosphatides as they occur in the soybean and differing from the fluid preparations (the "lecithins" of commerce) in a lower oil content—approximately four percent.
[6] A commercial source of the alcohol-soluble fraction of the mixed soya phosphatides, having a higher content of lecithin and less of the "cephalin" fraction than RG.
[7] Upon extracting RAS with 10 v./v. of alcohol 95 percent, we find that only about seventy percent of the material is now soluble. This is reflected in the reduced quantities of phosphatidylinositol and ethanolamine found which are the main components of the cephalin fraction.

EXAMPLE 6

The following quantities of materials were made into an emulsion in a Cherry-Burrell homogenizer.

| | | |
|---|---|---|
| Cottonseed oil (Wesson Oil) | grams | 375 |
| Soya phosphatide fraction [1] | do | 24 |
| Pluronic F 68 | do | 7.5 |
| Dextrose | do | 125 |
| Deionized water | mls | 2000 |

[1] Prepared in the manner described in Example 5.

Repeated injections of this emulsion into cats at five to ten milliliters/kilogram has shown no evidence of depressor activity, whereas 0.1 milliliter/kilogram of an The procedures used for determining the various values shown in Table I were as follows: Total nitrogen, Micro-Kjeldahl; Phosphorus, Fiske and SubbaRow, J. Biol. Chem., 66, 375 (1925); Choline, D. Glick, J. Biol. Chem., 156, 643 (1944); Ethanolamine and Serine, separated by procedure of C. Artom, J. Biol. Chem., 157, 585 (1945), with determination by an adaptation of S. Moore and W. H. Stein, J. Biol. Chem. 211, 907 (1954); Inositol, adaptation of the pyridoxine method of Atkin et al., (Anal. Ed) Ind. Eng. Chem., 15, 141 (1943), using *Sacch. carlsbergensis*, ATCC 9080; Fatty Acids, two hour hydrolysis with 2 N sodium hydroxide in fifty percent ethanol followed by acidification and extraction with petroleum ether; and iodine value, U.S.P.

It may be concluded from the table that the purified fraction of soya phosphatides obtained by the present process is a mixture of phosphatidylcholine (lecithin), phosphatidylethanolamine, and phosphatidylserine. Lecithin is the predominant constitutent. Phosphatidylinositol is essentially absent which may well be a significant characterizing feature. Circumstantial evidence indicates that phosphatidylinositol is the reactive or most reactive agent which produces a fall in the blood pressure of the anesthetized cat, (1) because there is a rough parallelism between the amount present in the various materials tested and their respective activities, and (2) a fifty percent concentrate of phosphatidylinositol was found to be highly active.

It is to be understood that the invention is not to be limited to the exact details of operation or compositions shown and described, as obvious modifications and equivalents will be apparent to one skilled in the art, and the invention is therefore to be limited only by the scope of the appended claims.

We claim:

1. A therapeutic fat product which is especially suitable for intravenous use in human beings, which product comprises a metabolizable, non-toxic, fixed oil emulsified in an aqueous vehicle by a soya phosphatide fraction which (1) is stable; (2) is water-dispersible; (3) is vegetable oil-soluble; (4) is monatomic lower-molecular weight aliphatic alcohol-soluble; and (5) is prepared by adsorbing undesirable reactive materials found in monatomic lower molecular weight aliphatic alcohol-dissolved soya phosphatides on an adsorbent selected from the group consisting of aluminum oxide, magnesium oxide and activated carbon.

2. The composition of claim 1 which contains in addition an intravenously compatible sugar as an isotonic agent and an intravenously compatible ethylene oxide-polypropylene glycol condensation product as a co-emulsifier.

3. A therapeutic fat product which is especially suitable for intravenous use in human beings, which product comprises a metabolizable, non-toxic, fixed oil emulsified in an aqueous vehicle by a stable, water-dispersible, vegetable oil-soluble soya phosphatide fraction (1) which is prepared by adsorbing undesirable reactive materials found in ethanol-dissolved soya phosphatides on aluminum oxide and (2) which has the following approximate composition:

| | |
|---|---|
| Total nitrogen _____percent__ | 1.44 |
| Total phosphorus _____do____ | 3.01 |
| Choline _____do____ | 10.60 |
| Inositol _____do____ | 0.01 |
| Ethanolamine _____do____ | 0.47 |
| Serine_____do____ | 0.045 |
| Iodine value (of total composition) _____ | 85.9 |
| N : P molecular ratio _____ | 1.026 |
| Reducing substance (as galactose) ____percent__ | 2.16 |
| Fatty acids _____do____ | 70.7 |
| Iodine value (of fatty acids) _____ | 118.2 |

4. The composition of claim 3 which contains in addition an intravenously compatible monosaccharide as an isotonic agent and an intravenously compatible ethylene oxidepolypropylene glycol condensation product as a co-emulsifier.

5. A therapeutic fat product which is especially suitable for intravenous use in human beings, which product comprises a metabolizable, non-toxic, fixed oil, emulsified in an aqueous vehicle by a stable, water-dispersible, vegetable oil-soluble soya phosphatide fraction (1) which is prepared by adsorbing undesirable reactive materials found in ethanol-dissolved soya phosphatides on non-acids activated carbon and (2) which has the following approximate composition:

| | |
|---|---|
| Total nitrogen _____percent__ | 1.45 |
| Total phosphorus _____do____ | 2.84 |
| Choline _____do____ | 10.04 |
| Inositol _____do____ | 0.04 |
| Ethanolamine _____do____ | 0.4 |
| Serine _____do____ | 0.4 |
| Iodine value (of total composition) _____ | 69.4 |
| N : P Molecular ratio _____ | 1.128 |
| Reducing substance (as balactose) ____percent__ | 28.3 |
| Fatty acids _____do____ | 47.8 |
| Iodine value (of fatty acids) _____ | 105.8 |

6. The composition of claim 5 which contains in addition an intravenously compatible monosaccharide as an isotonic agent and an intravenously compatible ethylene oxide-polypropylene glycol condensation product as a co-emulsifier.

7. A therapeutic fat product which is especially suitable for intravenous use in human beings, which product comprises about fifteen percent weight/volume of cottonseed oil emulsified in an aqueous vehicle by about 1.2 percent weight/volume of a stable, water-dispersible, vegetable oil-soluble soya phosphatide fraction which is prepared by adsorbing undesirable reactive materials found in ethanol-dissolved soya phosphatides on aluminum oxide, about four percent weight/volume of dextrose, and about 0.3 percent weight/volume of an ethylene oxide-polypropylene glycol condensation product of the formula $HO(C_2H_4O)(C_3H_6O)(C_2H_4O)H$ with a polypropylene-base molecular weight of about 1750 and a total molecular weight of about 8750.

References Cited in the file of this patent

UNITED STATES PATENTS

| | | |
|---|---|---|
| 1,667,767 | Bollmann | May 1, 1928 |
| 1,776,720 | Bollmann | Sept. 23, 1930 |
| 2,646,354 | Wachetl et al. | July 21, 1953 |
| 2,674,619 | Lundsted | Apr. 6, 1954 |

FOREIGN PATENTS

| | | |
|---|---|---|
| 496,521 | Canada | Sept. 29, 1953 |

OTHER REFERENCES

Meng et al.: J. Lab. and Clin. Med. 33:6, pp. 689–707, June 1948.

Waddell et al.: J. Lab. and Clin. Med. 45:5, pp. 697–710, May 1955.

Chem. and Eng. News, 28:10, p. 3428, October 2, 1950.

Gorens: J. Lab. and Clin. Med., vol. 34, pp. 1627–1633 (1949).

Holman: "Progress in the Chem. of Fats and Other Lipids," vol. 3, 1955, Pergamon Press, N.Y., pp. 2–17.